April 28, 1953  E. O. PAINTER  2,636,343
REACTION PROPULSION ENGINE
Filed May 27, 1949  4 Sheets-Sheet 1

INVENTOR.
*Ernest O. Painter*
BY
Mason & Mason
ATTORNEYS

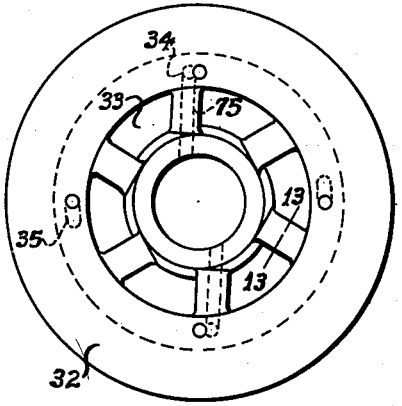
Fig. 2
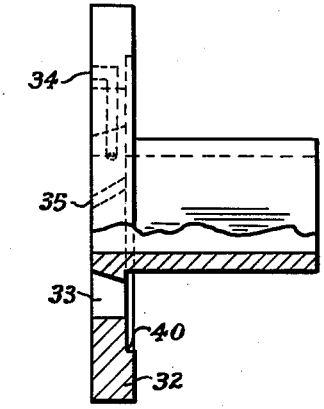
Fig. 3
Fig. 13
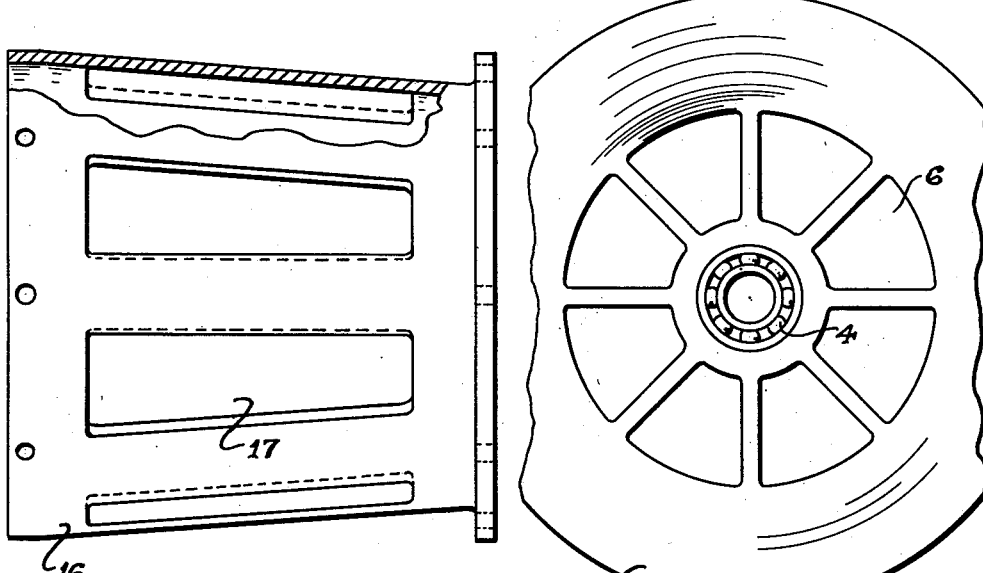
Fig. 4
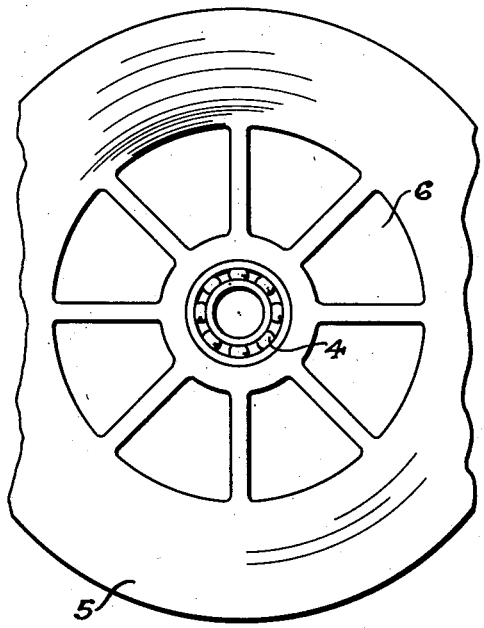
Fig. 5
INVENTOR,
Ernest O. Painter
BY Mason + Mason
ATTORNEYS April 28, 1953          E. O. PAINTER          2,636,343

REACTION PROPULSION ENGINE

Filed May 27, 1949          4 Sheets-Sheet 3

INVENTOR,
Ernest O. Painter
BY Mason & Mason

ATTORNEYS

Patented Apr. 28, 1953

2,636,343

UNITED STATES PATENT OFFICE 2,636,343

REACTION PROPULSION ENGINE

Ernest O. Painter, Freedom, Pa.

Application May 27, 1949, Serial No. 95,759

3 Claims. (Cl. 60—35.6)

This invention relates to a reaction propulsion engine which is particularly applicable as a prime mover to supply the power unit or units for propelling airplanes through space. However, the application of this engine is not to be confined in use to aircraft as the engine may be used to propel any vehicle suitable for a reaction thrust propulsion. Also, by slightly modifying the structure of this invention, which modification would not depart from the principles set forth in the claims, this engine may be used as a gas turbine to supply external shaft load for driving electric generators, pumps, compressors and other stationary mechanical loads. This application is a continuation-in-part of my previous abandoned application, Serial No. 645,288, filed February 4, 1946, and entitled "Internal Combustion or Jet Propulsion Power Plants." The most important feature of a jet propulsion engine is to provide a means for a gaseous fluid discharge from a reaction thrust nozzle. The gaseous fluid discharge must be dense, large in volume and of high velocity in order to maintain a steady reaction thrust to the vehicle which is to be propelled. For best results the gaseous fluid discharge orifice should be directed substantially 180° from the line of flight or directional movement of the vehicle to which it is housed and which is to be propelled.

One of the objects of this invention is to provide a means for increasing the velocity and density of the gaseous fluid discharge at the reaction nozzle by introducing supplementary revolving fuel jets in the reaction nozzle. By providing supplementary fuel jets, an increase in the velocity of the volume of the gaseous fluid discharge is obtained and the discharge is uniformly distributed over the emitting area of the reaction nozzle.

An additional object of this invention is to provide a reaction propulsion engine having a double stream reaction nozzle so that a useful portion of the gaseous discharge may be diverted away from the inner wall of the larger orifice to the more central emitting area of the smaller orifice. By providing such an arrangement resistance and "skin effect" to the discharge of gaseous fluids at a high velocity on inner conducting walls of the orifice are eliminated and, therefore, a useful portion of the discharge passes to the center of the fluid emitting area.

A further object of this invention is to provide a reaction propulsion engine with an improved form of air compressor carried by the rotor shaft and using the principles of both the axial flow compressor and the centrifugal flow corpressor such that the combined result has supercharger effect upon the explosive mixture produced in the combustion chamber and in which the power absorbed by the air compressor is a much smaller fraction of the power produced and utilized to provide a turbine rotation of a power shaft.

It is a still further object of this invention to improve upon the air supply means for a reaction propulsion engine by providing a pre-heating means for the atmospheric air that passes over the outer shell of the turbine before it reaches the reaction nozzle, thus resulting in a more efficient operating engine, particularly at its lower rates of speed and power. In the form of the invention to be described, the preheating means obtains its heat supply from the waste heat radiated from cooling fins of the turbine combustion chamber.

An additional important object of this invention is to provide an improved type of reaction propulsion engine having a number of revolving fuel jets carried by the rotary shaft to evenly distribute and atomize by centrifugal action the liquid fuel into the combustion chamber preceding the turbine units. Additional revolving propulsion fuel jets may be provided following the turbine units to supplement the reaction thrust passing through the jet nozzle.

A still further object of this invention is to provide a reaction propulsion engine having a nozzle and an improved form of liquid fuel feeding apparatus for the revolving fuel jets, the apparatus being so designed that the fuel is fed by centrifugal force obtained from the rotor, thus resulting in an automatic increase in the amount of delivered fuel as the rotor speed and the power produced is increased. This increase in the fuel volume intensity which tends toward atomization due to the high centrifugal force will instantly blend with the centrifugally compressed air and result in a very highly explosive mixture.

It is still another object of this invention to provide an internal combustion engine of the gas turbine or jet propelled types with an improved form of turbine construction in which both the rotor and the stator turbine members are formed of rigid, self-contained cast units having an inner hub, an outer ring or shroud member together with a plurality of blades radially disposed between the hub and the ring to thus form a turbine assembly which may absorb and transform into rotational energy a maximum amount of axial thrust explosion pressure. The unit cast form of turbine member referred to also results in a fly wheel effect upon the rotor, thus adding to the smoothness of the rotational power developed in the gas turbine.

It should be understood that the improvements I have invented and referred to above such as: the combined axial flow and centrifugal flow air compressor, the revolving fuel jets, the preheated air supply, the improved turbine blade construction, and the centrifugal fuel feeding system may be applied with advantage to either a gas turbine power plant, a jet propulsion power plant, or a combined gas turbine propeller assisted jet propulsion power plant. Therefore, although the invention will be specifically described in connection with reaction propulsion engine it should be apparent that the principles of the invention may be applied to stationary gas turbine power plants or to the powering of boats, automobiles, railroad engines, etc. By increasing the number of turbine blades or turbine units to a maximum, the horsepower absorbed by the gas turbine may be increased to such an extent as to make available at the rotor shaft, a maximum supply of power in addition to that required to operate the air compressor and the fuel feeding system. By reducing the number of turbine units somewhat, the exhaust pressure available for jet propulsion may be increased while still making available sufficient extra power in the rotor shaft to rotate and power an airplane propeller. Thus a combined gas turbine and propeller assisted jet propulsion power plant for aircraft can be obtained.

My invention further provides for the addition of supplementary revolving liquid fuel propulsion jets located at the exhaust end of the turbine and supplied with an auxiliary source of preheated air and the exhaust from the turbine to form an explosive mixture.

Further objects of the invention will be apparent by referring to the specification and drawings in which Figure 1 is a longitudinal sectional view of the reaction propulsion engine.

Figure 2 is a sectional view of the cone intake disk of the reaction propulsion engine taken along the lines 2—2 of Figure 1.

Figure 3 is an enlarged side view, partly in section, of the cone intake disk shown in section in Figure 2.

Figure 4 is an elevational view, partly in section, of a frame member of spider shown in Figure 1.

Figure 5 is an elevational view of the intake bell housing shown in Figure 1, as seen from line 5—5.

Figure 13 is a sectional view showing the shape of the spokes of the intake disk taken on the lines 13—13 of Figure 2.

Figure 1:
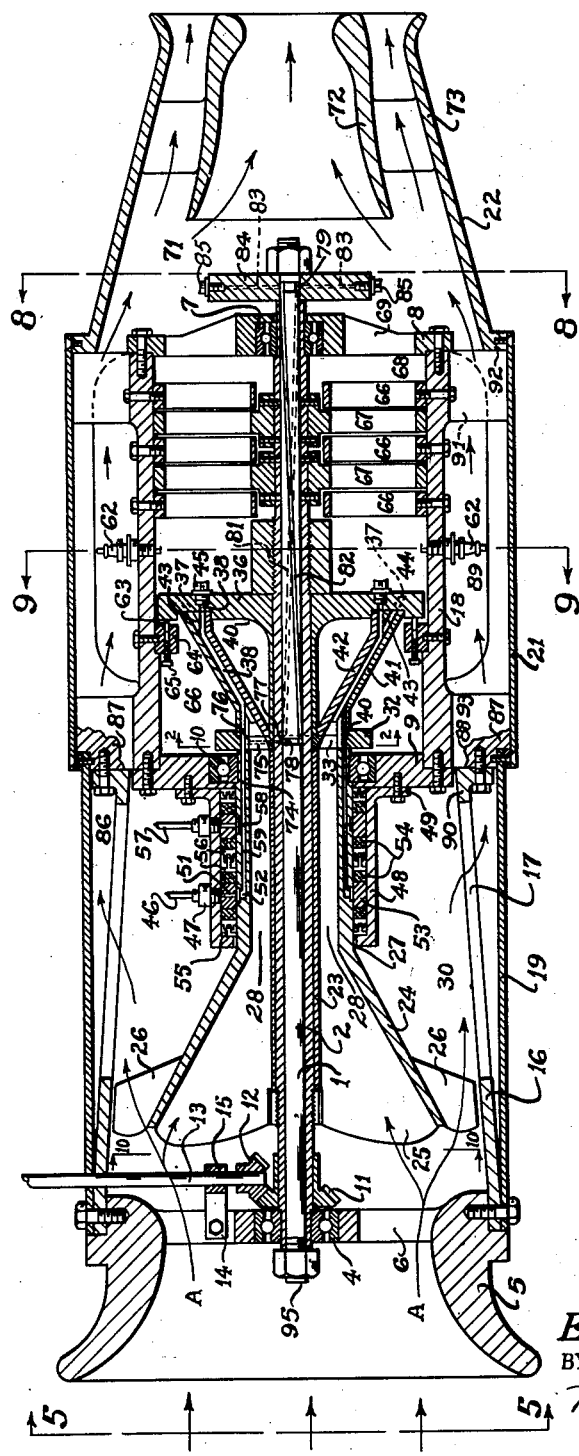

Referring to Figure 1 of the drawings in connection with which a reaction propulsion engine will be described, the rotor shaft consists of an inner solid shaft 1 and an outer hollow shaft 2 closely fitting around the shaft 1 and forming a unitary structure so that both shafts revolve together. Shaft 2 is journaled at one end in the ball or roller bearing 4 mounted on the intake casting 5. The engine comprises an intake casting 5 provided with a flared opening and a plurality of air intake ports 6, the ports 6 being more clearly shown in Figure 5. The other end of the shaft 2 is journaled in the ball bearing 7 supported at the hub of a circular turbine chamber end casting 8, the end casting having a plurality of exhaust gas ports 69 therethrough. Splined at the end of the rotor shaft 2 near the intake casting 5 is a bevel gear 11 which engages the bevel gear 12 splined to the shaft 13. The bracket and bearing respectively, for the shaft 13 are represented on the drawings by numerals 14 and 15, respectively. The motor for revolving shaft 13 is not shown but any suitable electric motor may be used. When shaft 13 is revolved, shafts 1 and 2 commence rotation and thereby start the engine running.

Figure 9:
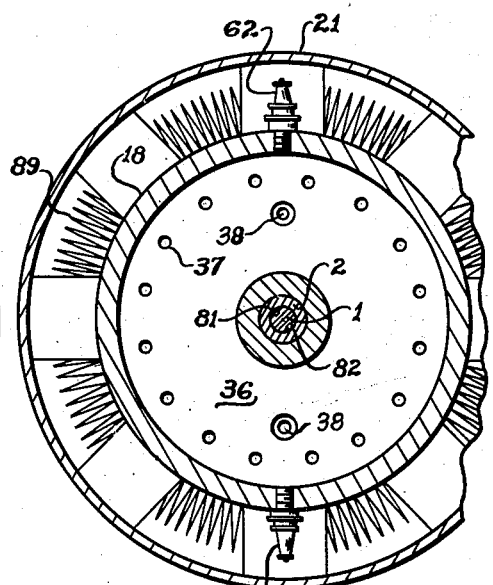
Figure 9 is a transverse section on the line 9—9 of Figure 1 showing the details of the turbine combustion chamber and its cooling fins.

Atmospheric air enters the reaction propulsion engine through the plurality of "spoke-like" holes 6 (see Fig. 5) in the intake orifice casting 5 when the engine shafts 1 and 2 are revolving at a high speed due to the starting motor. The velocity of the atmospheric air entering the intake orifices 6 is correspondingly increased with relation to the speed of an air plane moving through space, to which the engine is attached. The frame of the engine unit is comprised of the intake casting 5, the eight legged spider casting 16 (reference is made to Fig. 4 of the drawings) having air passageway ports 17, the turbine outer shell 18 (reference is made to Fig. 9 of the drawings), and the turbine end casting 8, all bolted together as shown in Fig. 1 of the drawings. Surrounding the spider casting 16 is an air-tight metal shell 19 and surrounding the turbine shell 18 is an air-tight metal shell 21 which is fastened at one end to an end of the metal shell 19 and at its other end is bolted to the jet propulsion nozzle casting 22 to be hereinafter described.

Figure 10:
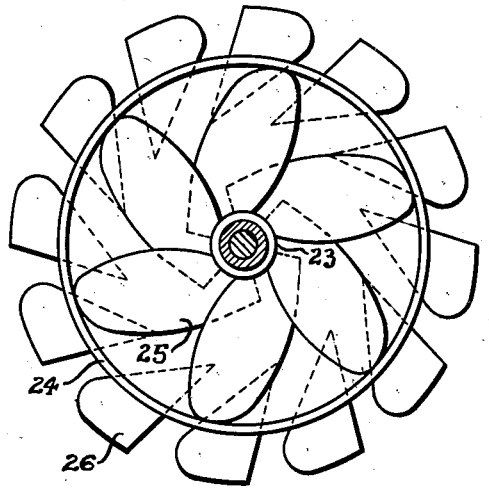
Figure 10 is a transverse section on the line 10—10 of Figure 1 showing the details of the intake end of the air compressor cone.

Fastened to the rotor shaft 2 is the inner hub 23 of the axial flow air compressor cone 24. The wall of compressor cone 24 is journalled at 95 to receive ball bearing 10 supported by the turbine end plate 9 in order to balance and support the entire rotating member at approximately the center of the machine and to thereby eliminate vibration and oscillatory stresses. The cone is provided with a plurality of radially extending fan blades or vanes 25 (see Figs. 1 and 10) fastened between the outer cone 24 and the hub 23. The cone is further provided with radially extending fan blades 26 secured to the outer face of cone 24 (as shown in Fig. 1 of the drawings) and extending close to but spaced from the spider casting 16. The blades 25 and 26 are shaped as shown in Fig. 10 of the drawings. It can be seen that the cone 24 and blades 25 and 26 rotate with the shafts 1 and 2 when the starting motor is operated. Accordingly, atmospheric air having passed through intake orifices 6, as hereinbefore explained, will be drawn into two separate circuit paths by the impelling action of blades 25 and 26, which revolve with and are part of the centrifugal compressor cone 24. The above circuits are indicated by arrows A on Fig. 1 of the drawings.

Figure 11:
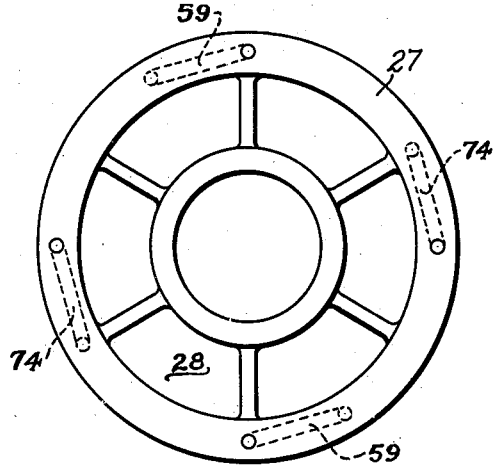
Figure 11 is an end elevational view of the air compressor cone taken along the lines 11—11 of Figure 12.
Figure 12:
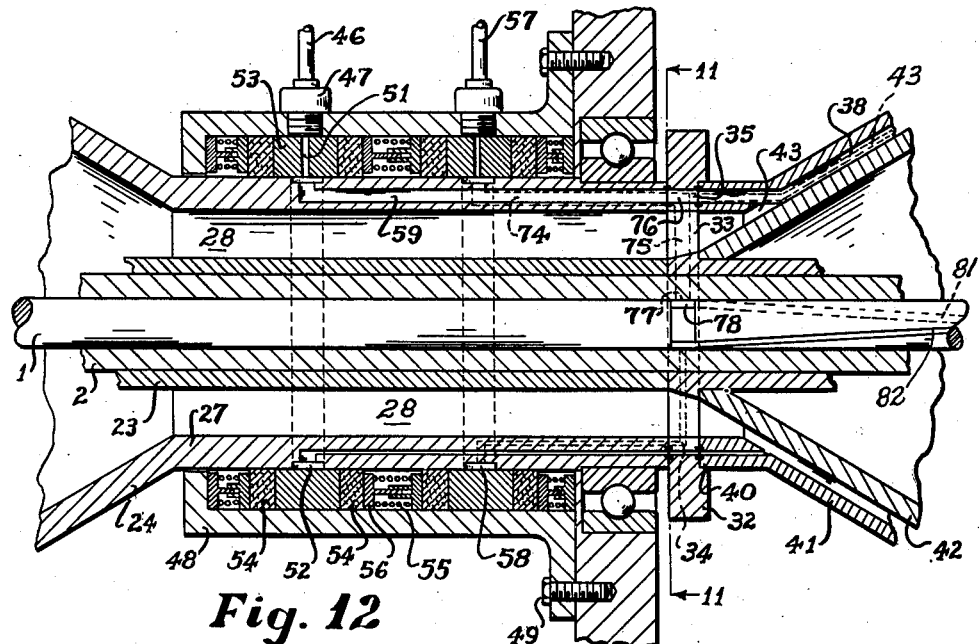
Figure 12 is an exploded longitudinal sectional view, similar to a portion of Figure 1, of the air compressor cone and its associated parts.

The first of the above circuits, namely the air entering cone 24, will be explained first. It is to be noted that the cone 24 gradually decreases in diameter, as shown in Fig. 1 of the drawings, from a large diameter near the intake casting 5 to a greatly reduced unvaried diameter at 27. Atmospheric air urged axially rearwardly by the action of the blades 25 is gradually increased in velocity until it reaches the unvarying diameter region 27 of the cone 24. Accordingly, atmospheric air in region 27 flows in a steady state at a much higher velocity than at the entrance of the cone 24. The end of the cone 24 opposite the large diameter end is shown in Figs. 11 and 12 of the drawings. The "spoke-like" passageways for the air leaving the cone are shown at 28. Ports 59 and 74 are liquid supply ports and will be referred to hereinafter. Surrounding and fastened to the shaft 2 at the end of the axial cone 24 is an intake disk 32 having the "spoke-like" air passageways 33, the disk being more particularly shown in Figs. 2 and 3 of the drawings. The disk 32 also has fuel feeding ports 34 and 35 to be hereinafter described. It can be seen, however, that the air exhausted from the cone 24 passes through the radially disposed openings 33 of the disk 32.

Figure 6:
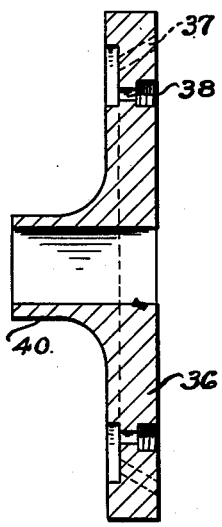
Figure 6 is a sectional view along the lines 6—6 of Figure 7, of the circular plate 36 shown in Figuse 1.
Figure 7:
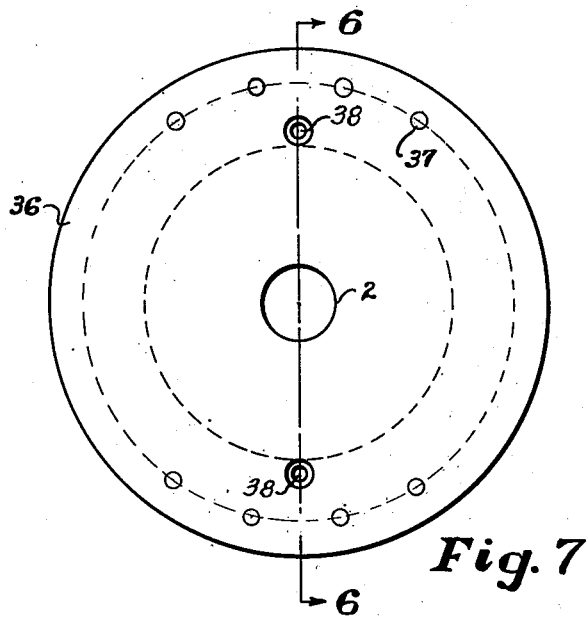
Figure 7 is a front elevational view of the circular plate 36 shown in Figures 1 and 6.
Figure 8:
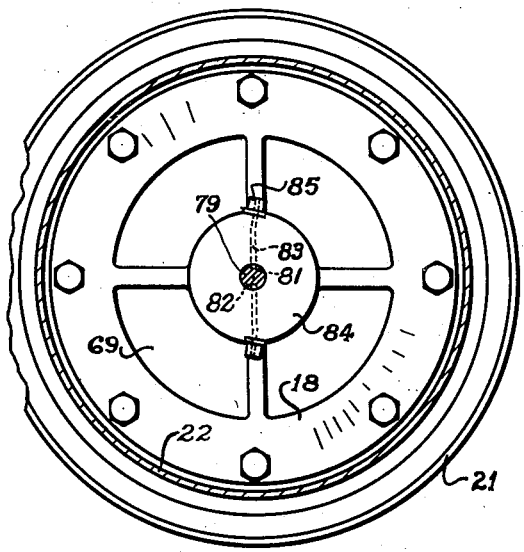
Figure 8 is a transverse section on the line 8—8 of Figure 1 showing the supplementary revolving fuel jets in the exhaust chamber.

Also surrounding the shaft 2 and rotating therewith is a circular plate 36 forming an end of the gas turbine combustion chamber to be hereinafter described. The plate 36 has a hub 49, referring to Figs. 1, 6 and 7 of the drawings, and a plurality of air ports 37 and fuel ports 38. The plate 36 rotates within the barrel 19 of the gas turbine combustion chamber.

Supported between the peripheral edges of the end plate 36 and the disk 32, at 40', are the centrifugal compressor cones 41 and 42. The cones 41 and 42 are so shaped as to form a plurality of air passageways 43 therebetween which communicate at one end thereof with passageways 33 of the disk 32 and at the other end thereof with ports 37 of the plate 36. Facing surfaces of the two cones 41 and 42 are milled to cooperate with each other so that the air passageways 43 are spiral in form and gradually extend tangentially while progressing axially toward end plate 36. Accordingly, it can be seen that ports 37 are provided in the end plate 36 so that the highly compressed air resulting from the axial compression in cone 24 and the centrifugal compression between cones 41 and 42 may be expelled with a swirling motion into the gas turbine combustion chamber 44.

From the above described arrangement of the air passageways in the first circuit, it can be seen that the high velocity of air in the cone region 27 above referred to, is acted upon by centrifugal force when the air enters the passageways 43 which in turn further increases the air velocity due to the fact that they extend tangentially in a smooth curve, while progressing axially with respect to shaft 2 toward the end plate 36. As a result of the above the air entering the chamber 44 through ports 37 travels at a very high velocity. The velocity of the air within the chamber 44 is reduced after being discharged by ports 37, but considerable turbulence takes place within chamber 44 because of the high rate of air discharged in a rotating motion. Within the chamber 44, the turbulent atmospheric air meets, and is amalgamated with liquid atomized fuel which is being discharged into combustion chamber 44 by the gas turbine revolving fuel jets 45. The fuel feeding system for the jets 45 is hereinafter described.

On particularly referring to Figures 1 and 12, fuel is fed through a throttle valve, not shown, to the gas line 46 which terminates in a fitting 47 on the feed gland housing 48, the gland housing being bolted to the turbine end plate 9 at 49 and surrounding, but not connected with, the axial flow compressor cone 24 at its reduced diameter portion 27. Liquid fuel entering the gland 48 by feeder tube 46 passes through the stationary port 51 to the revolving reservoir 52 which is machined into the outer surface of compressor cone 24. Stationary port 51 is machined into a precision fitted anti-friction sealing ring 53 which is held stationary within gland 48 by a number of end screws, not shown. Sealing ring 53 can be made of soft bearing metal but preferably of a metal having a graphite base. To prevent leakage of liquid fuel along the surface of sealing ring 53, a series of organic packing rings 54, are used. The packing rings are subjected to constant spring pressure by means of the compression of springs 55 which are housed between pressure rings 56 that are precision fitted to the inner diameter of gland 48 to provide a small amount of clearance between cone 24. A second feeder tube 57 supplies fuel to a second reservoir 58 in the cone 24 in precisely the same manner as that just described for feeder tube 46.

Liquid fuel from reservoir 52 passes through passageways 59 in the cone 24, through the ports 35 in disk 32 and through the passageways 38 between the cones 41 and 42, to the revolving fuel jets 45. The passageways 38 are spirally positioned between cones 41 and 42 to communicate between the ports 35 and the jets 45. Fuel conducting ports 59 lag rotational direction from their beginning at reservoir 52 to disk 32 by a number of degrees within design limitations, in order to force liquid fuel axially rearwardly between reservoir 52 and disk 32. Fuel passageways 38 lag rotation in a smooth curve from disk 32 to jets 45 in order to produce high p. s. i. at fuel jets 45 by centrifugal action. Since the jets 45 are mounted on the revolving end plate 36 and the spirally shaped fuel passages 38 are carried between the revolving cones 41 and 42 it should be obvious that the fuel liquid will be fed by centrifugal force and expelled evenly distributed under high atomizing pressure into the chamber 44. It is to be noted that an adjustable spring seated sealing ring 63 is supported in an assembly 64 secured to shell 18. Sealing ring 63 is held in a stationary position by the pressure adjusting screw 65 and rests on the back of disk 36 to prevent combustion chamber back pressure from entering region 66.

Ignition of the explosive mixture within combustion chamber 44, which consists of atmospheric air passing through ports 37 and atomized fuel from jets 45 is initiated by a pair of glow plugs 62. The diametrically opposed glow plugs 62 are used through a switching system, not shown, only during the starting period, i. e., to cause the preliminary combustion in the chamber 44 until its temperature becomes high enough to cause explosion of the explosive gas mixture. The gases caused by continuous and constant combustion of the explosive mixture within the chamber 44 is directed by the fixed directional stationary turbine blades 66 to impinge and impart force to the revolving turbine blades 67, thus establishing continuous rotational movement of the entire rotor 1. It can be seen that the turbine rotor is connected to the shaft 2. A conventional turbine is used and therefore further description is omitted as such a turbine is well known in the art. The exhaust gases issuing from the turbine into region 68 emerge at this location several atmospheres greater than the atmospheric conditions at intake orifice 6. From region 68, the highly heated gases pass through exhaust orifices 69, which are formed between the spokes of the end casting 8. The gases then pass into the double reaction thrust nozzle region 71, which is formed by thrust nozzle walls 72 and 73. Further explanation of the gases entering region 71 will be given hereinafter.

There are liquid fuel supply jets 85 provided in the reaction thrust nozzle 22, the purpose of which will now be explained. Referring to Figs. 1, 2, 3 and 8, liquid fuel entering reservoir 58 enters the passageways 74 in the cone 24 and passes to the ports 34 in the disk 32. It is to be noted that the fuel conducting ports 74 lag rotational direction from their beginning at reservoir 58 to disk 32 by a specific number of degrees within the design limitations in order to force liquid fuel axially rearward between reservoir 58 and disk 32. Referring particularly to Fig. 2 of the drawings, it can be seen that within the disk 32 liquid fuel is forced downwardly at 76 through passageways 75, by centripetal action, toward the center of the shaft 1. Fuel conducting ports 75, within disk 32, lead rotational direction from the larger diameter at 77 in order to accomplish centripetal action to force liquid fuel to enter reservoir 78. Reservoirs 78 and 79 are machined into the outer surface of shaft 1. Between fuel reservoirs 78 and 79 are two fuel conducting passageways 81 and 82 which are machined into the outer surface of inner shaft 1. The passageways 81 and 82 are spiral and lag rotation around inner shaft 1 in such a manner as to cause liquid fuel to be forced axially rearward by the rotation of shaft 1 between reservoirs 78 and 79. By particularly referring to Figures 1 and 8, it can be seen that from reservoir 79, liquid fuel is urged by centrifugal action to pass into fuel conducting passageways 83, these passageways being cored in revolving disk 84. From the fuel conducting passageways 83, liquid fuel at a high p. s. i. issues from the jets 85 due to the high centrifugal action of disk 84. The operation of the liquid fuel issuing from the jets 85 will be described hereinafter.

The liquid fuel issuing from revolving fuel jets 45 and 85 has been described as being pressurized by centrifugal action. It is to be understood, however, that it may be necessary to increase the pressure at the fuel jets of large high powered engines by supplying external tank pressure to gas feeder lines 46 and 57, this action supplementing the pressure obtained by centrifugal action at the fuel jets 45 and 85.

Referring particularly to Figures 1 and 4 of the drawings, the second circuit for the incoming atmospheric air will be explained. The radial fan blades 26 urge atmospheric air axially into region 30 whereupon the air passes through cored rectangular openings 17 of the spider 16 into region 86. The air in region 86 then passes through the openings 87 formed by the spoke-like arrangement 88, which are cast on the outer periphery of the main turbine shell 18, into region 93. Atmospheric air from region 93 passes over and between the hot turbine shell cooling fins 89 then through the openings 91, which are formed by the spoke-like arrangement 92, the spoke-like arrangement 92 being cast onto the outer periphery of the main shell 18, into region 71. The atmospheric air in its passage from region 93 over the hot cooling fins 89, to region 71, acquires considerable heat and expands as it emerges into the reaction thrust nozzle, before joining the gaseous fluid stream of the turbine exhaust in the nozzle 22. In region 71, the turbine exhaust gases meet with a stream of liquid fuel emitted by centrifugal action from the supplementary revolving fuel jets 85. The fuel from the jets 85 is ignited by the highly heated gases issuing from exhaust orifices 69, thus instituting a highly effective reaction thrust means, produced by continuous combustion within the reaction thrust nozzle itself. Due to the second circuit of heated atmospheric air, combustion in region 71 is supplemented and thereby at a maximum within the reaction thrust nozzle. Such an arrangement results in an efficient engine.

To operate the reaction propulsion engine just described, the starter shaft 13 is first rotated to cause the rotor shafts 1 and 2 to be revolved at approximately 500 to 700 revolutions per minute. Thus air is drawn through the intake 6 into the combined axial and centrifugal air compressor 24 from which it is expelled with a swirling action under pressure into the turbine combustion chamber 44. At the same time, liquid fuel is caused by centrifugal force to be thrown out through the revolving fuel jets 45 and atomized under high pressure into the turbine combustion chamber 44. The revolving fuel jets cause the explosive mixture to be evenly distributed in the combustion chamber. If the spark plugs 62 are then periodically energized, the mixture will be burned and exhaust gases expelled against the turbine unit to cause further and continuous rotation of the rotor shafts 1 and 2. Since the temperature in the combustion chamber 44 becomes high enough to insure continuous combustion of the gaseous mixture, the spark plugs 62 may be disconnected. The starter motor also may be disconnected at this time inasmuch as the turbine unit is now producing at least enough power to be self sustaining. Simultaneously with the foregoing actions, intake air passes through the openings 17 in the spider casting 16, into the space provided between the turbine shell 18 and the cooling fins 89 and finally emerging into the jet propulsion nozzle 22. This path for the air is indicated by arrows in Fig. 1 of the drawings. This heated air is combined with the heated turbine exhaust and the liquid fuel thrown outwardly and atomized by centrifugal force from the auxiliary revolving fuel jets 85. Thus additional combustion takes place to add to the reaction thrust of gases passing through the jet nozzle 22. After a few minutes of warming up, it can be seen that sufficient power is developed to permit the take-off of an airplane equipped with the power plant. Of course, the efficiency of the power plant will be increased when it is rushing through the air, thus adding to the pressure and velocity of the compressed air. It should be noted that the liquid fuel feed for all fuel jets is responsive to centrifugal force due to the rotation of the rotor shaft and because of this centrifugal action, an increase in rotary speed automatically increases the supply of liquid fuel to the combustion chambers. By increasing the volume and density of the fuel, a greater reaction thrust is provided. This, together with the steady turbine blade assemblies and the powerful action of the combined axial flow and centrifugal air compressor, an exceptionally powerful and speedy reaction propulsion engine having an extremely flexible speed and power range is provided.

If it is desired to use the principles of this invention in a combined gas turbine and propeller assisted reaction propulsion engine, it is only necessary to increase the number of turbine units sufficiently to transfer from the exhaust pressure from the gas turbine combustion chamber enough additional power to the rotor shaft for the operation for the propeller therefrom. The propeller may be mounted on a splined shaft extension 95 of the rotary shafts 1 and 2 and the intake casting may be suitably modified to resist the additional stresses. The air intake passageways may be also pointed somewhat to permit the intake of the propeller back-wash as desired.

In large high powered engines, it may be necessary to supplant radial fan blades 26, by several successive compression stages, in order to supply atmospheric air to the reaction thrust nozzle at a pressure in excess of back pressure, originating out of the high rate of combustion from within the reaction thrust nozzle. The above arrangement could easily be accomplished in this machine without departing from the operating principles as set forth here.

Referring to Figure 13 of the drawings, it can be seen that the spoke-like arrangement of disc 32 is shaped so as to be airfoil in order to offer the least possible resistance to the flow of the high velocity atmospheric air passing between these revolving spokes when the machine is in motion. However, this design is well known to the art, and other parts may be similarly shaped if desired.

It will be obvious from the drawings, that the main turbine shell 18, and the spider end casting 90, are completely enclosed in cylindrical airtight casings or cowls 21 and 19, in order to confine the atmospheric air circuit in regions 86 and 93.

Louvers, or shutters (not shown in the drawings) could be installed as part of intake orifice casting 5, to restrict or by-pass part of the atmospheric air before entering the centrifugal compressor by the turbine route, thus causing more atmospheric air to be forced directly to the reaction thrust nozzle through regions 86 and 93, or by restricting the flow of atmospheric air into both circuits, by bleeding part of the atmospheric air entering the intake back to the atmosphere. The louvers would be so arranged and connected so that control over their movement by the operator or pilot could be accomplished by one simple manual operation at the location of the regular controls.

The foregoing description of the invention is explanatory thereof and various changes in the size, shape and materials, as well as in the details of the illustrated construction may be made, within the scope of the appended claims, without departing from the spirit of the invention.

I claim:

1. A reaction propulsion engine comprising, a rotor shaft, a rotatable air compressor carried by said shaft, said air compressor including a rotatable axial flow compressor unit and a rotatable centrifugal flow compressor unit connected in tandem, an air intake for said compressor, a turbine combustion chamber, means connecting the output of said compressor to said combustion chamber, a number of atomizing fuel jets in said combustion chamber adjacent the discharge of said output connection and rotatably mounted on said shaft, means to supply liquid fuel under pressure to said jets, a turbine connected to the exhaust of said combustion chamber, the rotor of said turbine being connected to said shaft, a jet power nozzle including an exhaust chamber communicating with the exhaust of said turbine, a number of supplementary fuel jets in said exhaust chamber positioned in the path of the exhaust and rotatably mounted on said shaft, means to supply fuel under pressure to said supplementary jets, and means to supply additional air to said exhaust chamber, cooling fins exterior of said combustion chamber between which said additional air passes and becomes preheated, the fuel supply means for the fuel jets in the combustion chamber and the fuel jets in the exhaust chamber including centrifugal means for varying the pressure of said fuel in proportion to the rotational speed of said shaft, both of said fuel supply means including a liquid line terminating in a housing gland positioned adjacent said compressor, a revolving reservoir in the outer surface of said compressor into which the liquid from said gland passes and passageways from said reservoir to said fuel jets through which said liquid passes to said jets, and self-adjusting sealing means in said gland.

2. A reaction propulsion engine comprising, a rotor shaft, a rotatable air compressor carried by said shaft, said air compressor including a rotatable axial flow compressor unit and a rotatable centrifugal flow compressor unit connected in tandem, an air intake for said compressor, a turbine combustion chamber, means connecting the output of said compressor to said combustion chamber, a number of atomizing fuel jets in said combustion chamber adjacent the discharge of said output connection and rotatably mounted on said shaft, means to supply liquid fuel under pressure to said jets, a turbine connected to the exhaust of said combustion chamber, the rotor of said turbine being connected to said shaft, a jet power nozzle including an exhaust chamber communicating with the exhaust of said turbine, a number of supplementary fuel jets in said exhaust chamber positioned in the path of the exhaust and rotatably mounted on said shaft, means to supply fuel under pressure to said supplementary jets, and means to supply additional air to said exhaust chamber, cooling fins exterior of said combustion chamber between which said additional air passes and becomes preheated, the fuel supply means for the fuel jets in the combustion chamber and the fuel jets in the exhaust chamber including centrifugal means for varying the pressure of said fuel in proportion to the rotational speed of said shaft, both of said fuel supply means including a liquid line terminating in a housing gland positioned adjacent said compressor, a revolving reservoir in the outer surface of said compressor into which the liquid from said gland passes and passageways from said reservoir to said fuel jets through which said liquid passes to said jets, and self-adjusting sealing means in said gland, said additional air being obtained from a second air intake duct mounted concentrically and radially outwardly of the compressor intake, the compressor, the turbine combustion chamber and turbine, the air for said second duct being introduced adjacent said air intake for said compressor, said additional air upon discharge from said second duct being directed to join the exhaust from said turbine to provide thrust augmentation.

3. A reaction propulsion engine comprising, a rotor shaft, a rotatable air compressor carried by said shaft, said air compressor including a rotatable axial flow compressor unit and a rotatable centrifugal flow compressor unit connected in tandem, an air intake for said compressor, a turbine combustion chamber, means connecting the output of said compressor to said combustion chamber, a number of atomizing fuel jets in said combustion chamber adjacent the discharge of said output connection and rotatably mounted on said shaft, means to supply liquid fuel under pressure to said jets, a turbine connected to the exhaust of said combustion chamber, the rotor of said turbine being connected to said shaft, a jet power nozzle including an exhaust chamber communicating with the exhaust of said turbine, a number of supplementary fuel jets in said exhaust chamber positioned in the path of the exhaust and rotatably mounted on said shaft, means to supply fuel under pressure to said supplementary jets, and means to supply additional air to said exhaust chamber, cooling fins exterior of said combustion chamber between which said additional air passes and becomes preheated, the fuel supply means for the fuel jets in the combustion chamber and the fuel jets in the exhaust chamber including centrifugal means for varying the pressure of said fuel in proportion to the rotational speed of said shaft, both of said fuel supply means including a liquid one terminating in a housing gland positioned adjacent said compressor, a revolving reservoir in the outer surface of said compressor into which the liquid from said gland passes and passageways from said reservoir to said fuel jets through which said liquid passes to said jets, and self-adjusting sealing means in said gland, said supplementary fuel jets in said exhaust chamber being in a plane substantially perpendicular to said rotor shaft whereby the discharge therefrom is directed toward said additional air and the exhaust from said turbine to provide thrust augmentation.

ERNEST O. PAINTER.

References Cited in the file of this patent

UNITED STATES PATENTS

| Number | Name | Date |
|---|---|---|
| 2,304,008 | Müller | Dec. 1, 1942 |
| 2,396,911 | Anxionnaz et al. | Mar. 19, 1946 |
| 2,400,714 | Rowledge et al. | May 21, 1946 |
| 2,404,767 | Heppner | July 23, 1946 |
| 2,409,446 | Pavlecka et al. | Oct. 15, 1946 |
| 2,444,742 | Lutjen | July 6, 1948 |
| 2,445,856 | Mayer | July 27, 1948 |
| 2,479,777 | Price | Aug. 23, 1949 |
| 2,509,890 | Stalker | May 30, 1950 |

FOREIGN PATENTS

| Number | Country | Date |
|---|---|---|
| 347,206 | Great Britain | Apr. 16, 1931 |